United States Patent
Potter, Jr.

(10) Patent No.: US 7,039,914 B2
(45) Date of Patent: May 2, 2006

(54) MESSAGE PROCESSING IN NETWORK FORWARDING ENGINE BY TRACKING ORDER OF ASSIGNED THREAD IN ORDER GROUP

(75) Inventor: Kenneth H. Potter, Jr., Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 382 days.

(21) Appl. No.: 10/383,901

(22) Filed: Mar. 7, 2003

(65) Prior Publication Data

US 2004/0187112 A1 Sep. 23, 2004

(51) Int. Cl.
*G06F 9/46* (2006.01)
(52) U.S. Cl. .................. 718/102; 709/238; 718/107
(58) Field of Classification Search .............. 70/250; 718/102, 107
See application file for complete search history.

(56) References Cited

U.S. PATENT DOCUMENTS

| | | | | |
|---|---|---|---|---|
| 5,630,128 | A * | 5/1997 | Farrell et al. ............... | 718/103 |
| 5,745,778 | A * | 4/1998 | Alfieri ........................... | 712/1 |
| 5,870,567 | A | 2/1999 | Hausauer et al. ........... | 710/310 |
| 6,148,359 | A | 11/2000 | Elkhoury et al. ........... | 710/129 |
| 6,205,465 | B1 | 3/2001 | Schoening et al. ......... | 709/102 |
| 6,484,224 | B1 | 11/2002 | Robins et al. .............. | 710/305 |
| 6,505,228 | B1 | 1/2003 | Schoening et al. ......... | 709/106 |
| 2003/0163589 | A1* | 8/2003 | Bunce et al. ............... | 709/250 |
| 2004/0246980 | A1* | 12/2004 | Balakrishnan ............. | 370/412 |

FOREIGN PATENT DOCUMENTS

| | | |
|---|---|---|
| WO | WO 01/39430 A2 | 5/2001 |
| WO | WO 01/48606 A2 | 7/2001 |

OTHER PUBLICATIONS

Darren Kerr et al., "Sequence Control Mechanism for Enabling Out of Order Context Processing" U.S. Appl. No. 09/663,775, filed on Sep. 18, 2000.
Kenneth Potter and Trevor Garner, "Apparatus and Technique For Maintaining Order Among Requests Issued Over an External Bus of an Intermediate Network Node" U.S. Appl. No. 09/859,707 filed on May 17, 2001.

(Continued)

*Primary Examiner*—Kenneth S. Kim
(74) *Attorney, Agent, or Firm*—Cesari and McKenna, LLP (57) ABSTRACT

A system and method maintains order among a plurality of threads in a multi-threaded processing system. The processing system, which may be disposed at an intermediate network device, has a plurality of processors each supporting a plurality of threads. The ordering system includes a dispatcher that assigns work, such as the processing of received packets to free threads, an order manager that keeps track of the relative order of the threads, and a thread client associated with each thread for enforcing the determined order. Packets to be processed by the processing system are assigned to an initial order group by the order manager based on a selected attribute, and those packets sharing the same attribute value are assigned to the same order group. During processing, a thread may request reassignment to other order groups in response to other attributes of the packets. The order manager preferably manages the switching of threads among order groups and ensures that the threads within each order group process their packets in order.

36 Claims, 6 Drawing Sheets

OTHER PUBLICATIONS

Kenneth Potter and Trevor Garner, "Apparatus and Technique for Maintaining Order Among Requests Directed to a Same Address on an External Bus of an Intermediate Network Node" U.S. Appl. No. 09/859,709 filed on May 17, 2001.

Larry Houston, "Selecting an Appropriate Programming Model" COMMSDESIGN, Aug. 5, 2002, web site commsdesign.com/printableArticle/?articleID-16505551>.

Steve Melvin et al., "A Massively Multithreaded Packet Processor" Workshop on Network Processors -NPs at 9th International Symposium on High-Performance Computer Architecture, Feb. 8, 2003.

Werner Bux, et al. "Tecnologies and Building Blocks for Fast Packet Forwarding" IEE Communications Magazine, IEE Service Center. Piscataway, NJ, Jan. 1, 2001.

International Search Report for Application No. PCT/US2004/005420. Officer Ahmed Soliman, Jun. 21, 2005.

* cited by examiner

MESSAGE PROCESSING IN NETWORK FORWARDING ENGINE BY TRACKING ORDER OF ASSIGNED THREAD IN ORDER GROUP

BACKGROUND OF THE INVENTION

1. Field of the Invention

The present invention generally relates to multiprocessor systems and, more specifically, to the order by which multiple processors execute instructions.

2. Background Information

High-performance computer systems often utilize multiple processors or central processing units (CPUs). Each processor may have access to shared and/or private data, such as program instructions, e.g., algorithms, that are stored in a memory coupled to the processors. In addition, each processor may support one or many threads, where each thread corresponds to a separate instruction or execution sequence. One of the more common multiprocessor architectures is called a systolic array in which each processor is coupled to its nearest neighbors in a mesh-like topology, and the processors perform a sequence of operations on the data that flows between them. Typically, the processors of a systolic array operate in "lock-step" with each processor alternating between a compute phase and a communicate phase.

Systolic arrays are often used when the problem being solved can be partitioned into discrete units of works. In the case of a one dimensional systolic array comprising a single "row" of processors, each processor is responsible for executing a distinct set of instructions on input data so as to generate output data which is then passed (possibly with additional input data) to a next processor of the array. To maximize throughput, the problem is divided such that each processor requires approximately the same amount of time to complete its portion of the work. In this way, new input data can be "pipelined" into the array at a rate equivalent to the processing time of each processor, with as many units of input data being processed in parallel as there are processors in the array. Performance can be improved by adding more processors to the array as long as the problem can continue to be divided into smaller units of work. Once this dividing limit has been reached, processing capacity may be further increased by configuring multiple rows in parallel, with new input data allocated to the first processor of a next row of the array in sequence.

One place where multiprocessor architectures, such as systolic arrays, can be advantageously employed is in the area of data communications. In particular, systolic arrays have been used in the forwarding engines of intermediate network stations or nodes, such as routers. An intermediate node interconnects communication links and subnet-works of a computer network through a series of ports to enable the exchange of data between two or more end nodes of the computer network. The end nodes typically communicate by exchanging discrete packets or frames according to pre-defined protocols, such as the Transmission Control Protocol/Internet Protocol (TCP/IP) or the Internetwork Packet eXchange (IPX) protocol. The forwarding engine is often used by the intermediate node to process packets received on the various ports. This processing may include determining the destination of a packet, such as an output port, and placing the packet on an output queue associated with the destination.

Intermediate nodes often employ output queues to control the flow of packets placed into the computer network. In a typical arrangement, the output queues are configured as first-in-first-out (FIFO) queues where packets are placed (enqueued) at the end (tail) of the queues and removed (dequeued) from the beginning (head) of the queue. Placement and removal often entails accessing the queue, which includes writing and reading the packet or information related to the packet, such as a packet header, to and from the queue.

In some intermediate nodes, packets are enqueued and dequeued by the forwarding engine. In intermediate nodes that employ forwarding engines containing multiple processors, the output queues may be treated as shared resources, meaning that more than one processor can access a given queue at a given time. One problem with shared resources, however, is that packets received by the intermediate node in a given order may be processed and forwarded in a different order.

To resolve this problem, a systolic array can be configured to guarantee first-in-first-out (FIFO) ordering of context data processing. As used herein, context data or "context" is defined as an entire packet or, more preferably, a header of a packet. According to FIFO ordering, the contexts processed by the processors of the rows of the array must complete in the order received by the processors before the rows of the array advance. Each processor is allocated a predetermined time interval or "phase" within which to complete its processing of a context. When each processor completes its context processing within the phase, this control mechanism is sufficient. However, if a processor stalls or otherwise cannot complete its processing within the phase interval, all processors of the array stall in order to maintain FIFO ordering. Here, the FIFO ordering control mechanism penalizes both the processors of the row of the stalled processor and the processors of the remaining rows of the multiprocessor array.

For most applications executed by the systolic array, FIFO ordering is not necessary. However, FIFO ordering may be needed to maintain an order of contexts having a dependency among one another. Packets that correspond to the same "application flow" or more simply "flow" often need to be treated as having a dependency on each other. A flow is defined as a sequence of packets having the same layer 3 (e.g., Internet Protocol) source and destination addresses, the same layer 4 (e.g., Transport Control Protocol) port numbers, and the same layer 4 protocol type.

SUMMARY OF THE INVENTION

Briefly, the present invention is directed to a system and method for maintaining order among a plurality of threads in a multi-threaded processing system. In the illustrative embodiment, the processing system has a plurality of processors organized as one or more arrays, and each processor supports a plurality of threads. The processing system may be disposed at an intermediate network device, such as the forwarding engine of a router, so as to process network messages, such as packets. The ordering system includes a dispatcher that assigns work, such as the processing of received packets to free threads, an order manager that keeps track of the relative order of the threads each of which are processing different packets, and a thread client associated with each thread for enforcing the relative order. When packets are received, they are assigned to a first order group based on a selected criteria or attribute, such as the inbound physical interface on which the packets are received. During the processing of a given packet, the respective thread may request reassignment to other order groups in response to identifying other more detailed or different criteria or attributes of the packet, such as the identification of the packet's network protocol type, its application flow, its outbound tunnel, etc. The order manager preferably manages the switching of threads among order groups and, for each order group, the order manager in cooperation with the thread clients ensures that the threads corresponding to that order group process their packets according to their relative order.

More specifically, the dispatcher preferably generates a context for received packets and selects an initial or primary Group Identifier (ID) for the context. The initial Group ID specifies the first order group for the context. The dispatcher then identifies a free thread and passes the packet context to it for processing. The dispatcher also registers the Group ID and the ID of the thread to which the packet context has been assigned with the order manager. In the illustrative embodiment, the order manager stores this information in a plurality of tables, which are used to generate an order status that indicates, for each Group ID, and thus for each order group, which thread is at the head of line (HOL) for that Group ID. The thread clients prevent their respective threads from performing certain actions, such as accessing a shared resource, e.g., memory, or releasing the packet being processed, until the thread reaches the HOL for its order group. Nonetheless, a thread may perform actions that are not order-sensitive before the thread reaches the HOL. Furthermore, a thread may change order groups dynamically during the processing of a single packet. Nonetheless, the threads belonging to each order group are maintained in order relative to each other.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
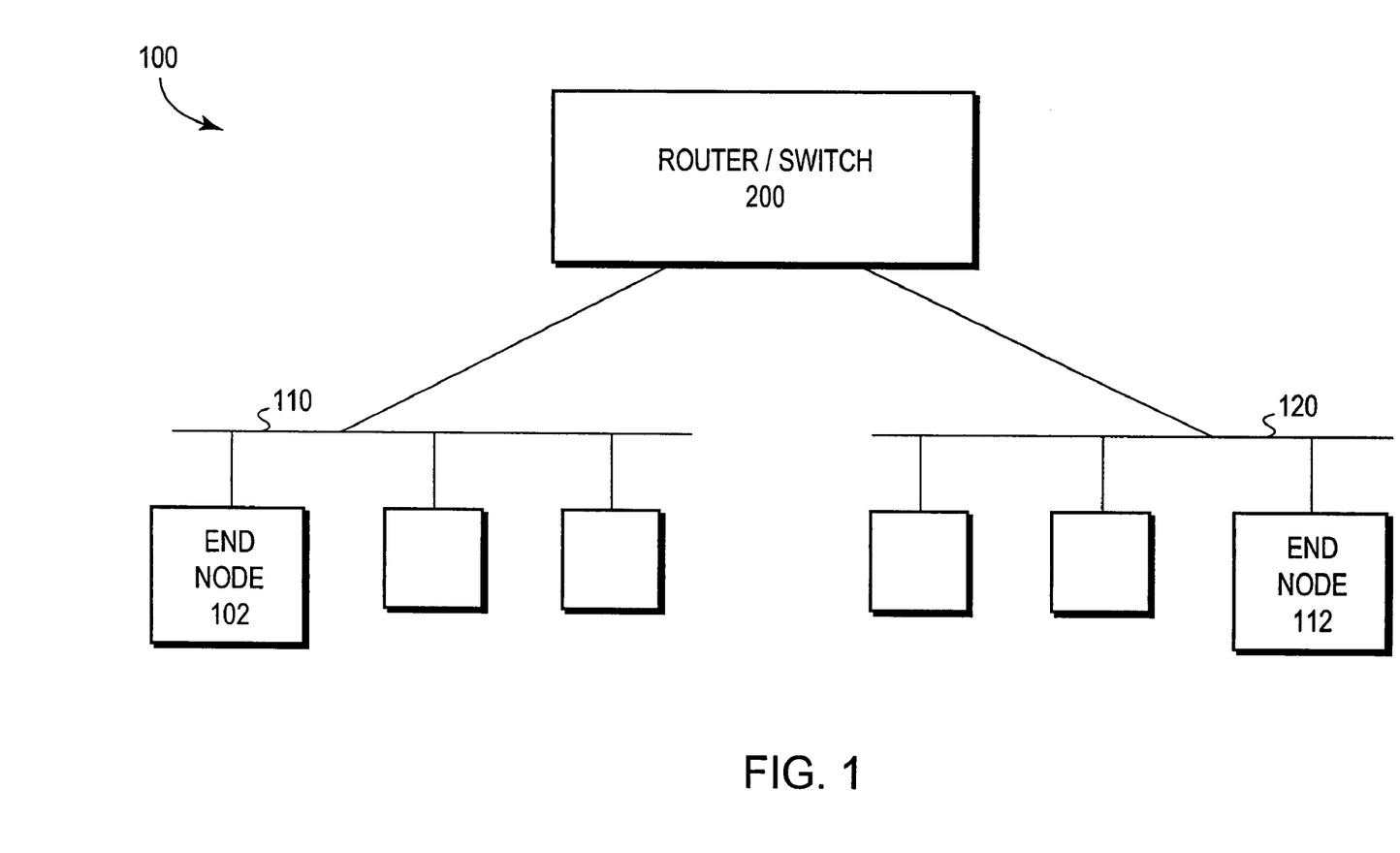
FIG. 1 is a block diagram of a computer network comprising a collection of interconnected communication media and subnetworks attached to a plurality of end nodes.

FIG. 1 is a block diagram of a computer network 100 comprising a collection of interconnected communication media and subnetworks attached to a plurality of stations. The stations are typically computers comprising end nodes 102, 112 and intermediate network node 200. The intermediate node 200 may be a router or a network switch, whereas the end nodes 102, 112 may include personal computers, workstations, servers, personal digital assistants (PDAs), etc. The subnetworks generally comprise local area networks (LANs) 110 and 120, although the invention may work advantageously with other communication media configurations such as point-to-point network links, wide area networks (WANs), wireless networks, etc. Communication among the stations of the network is typically effected by exchanging discrete network messages, such as frames or packets, between the communicating end nodes according to a predefined protocol, such as the Internet protocol (IP), the Internet Packet Exchange (IPX) protocol, the AppleTalk protocol, the DECNet protocol, etc.

Figure 2:
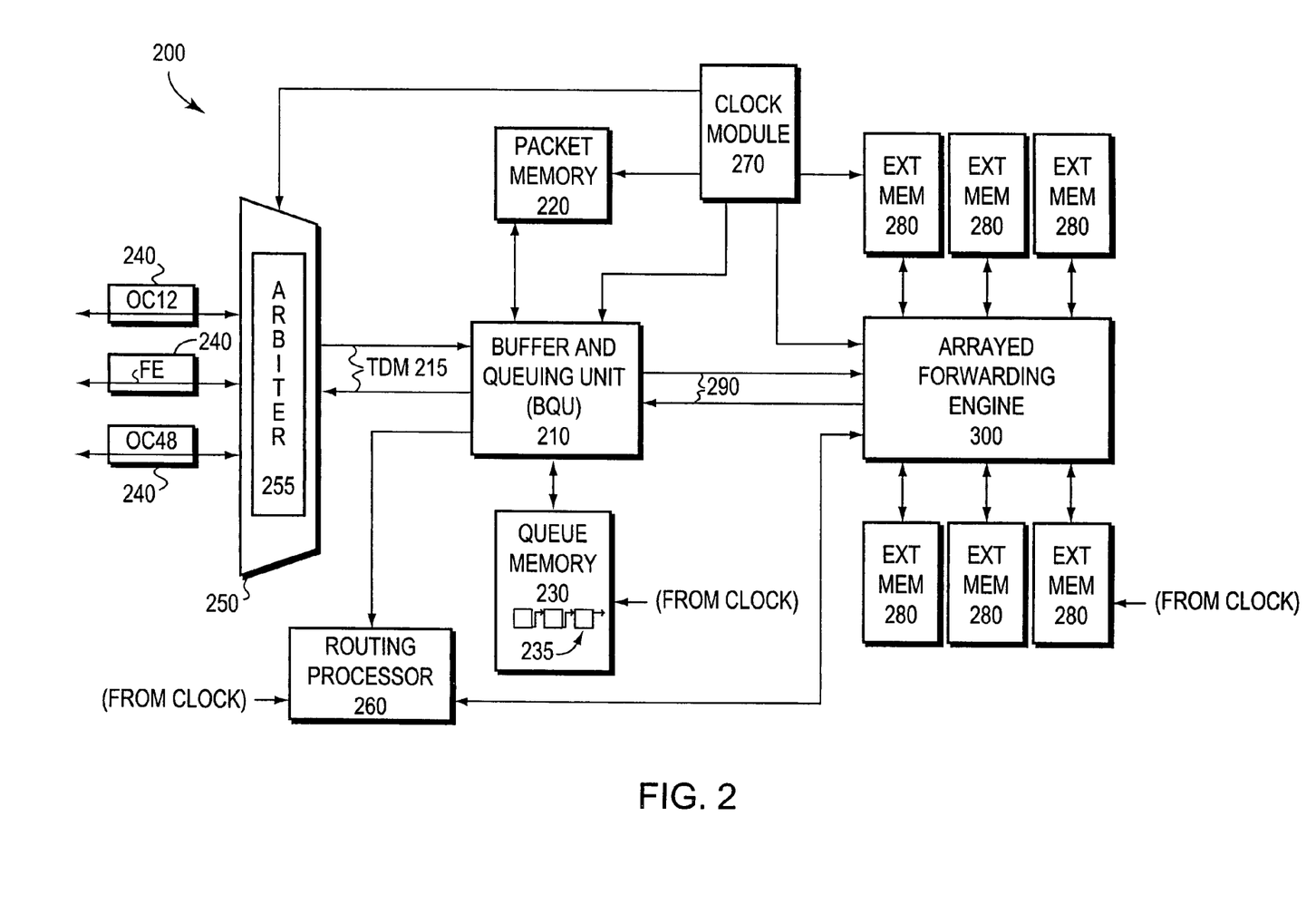
FIG. 2 is a schematic block diagram of an intermediate network node, such as a network switch, that may be advantageously used with the present invention.

FIG. 2 is a schematic block diagram of intermediate node 200 that, in the illustrative embodiment, is preferably a network switch. The switch generally performs layer two (L2) processing functions, such as "cut-through" operations wherein an entire frame does not have to be stored before transfer to a destination. In addition, node 200 also implements layer three (L3) forwarding operations. It should be noted, however, that the intermediate node 200 may also be configured as a router to perform L3 route processing. A feature of the architecture described herein is the ability to program node 200 to execute L2, L3 or higher-layer operations. To that end, operation of node 200 will be described with respect to IP switching of packets, although it may be programmed for other applications, such as data encryption.

Intermediate node 200 comprises a plurality of interconnected components including an arrayed forwarding engine 300, various memories such as external memory (Ext Mem) 280, a buffer and queueing unit (BQU) 210 and network port interface cards 240. Operations of these components are preferably synchronously controlled by a clock module 270 although the arrayed elements of the forwarding engine 300 may be operatively configured to function asynchronously. In the illustrative embodiment, the clock module 270 globally distributes its clock signals via clock lines to the components of node 200.

The external memories (Ext Mem) 280 generally comprise random access memory (RAM) storage locations addressable by the forwarding engine 300 for storing software programs and data structures accessed by the components. An operating system, portions of which are typically resident in memory 280 and executed by the engine 300, functionally organizes the node 200 by, inter alia, invoking network operations in support of software processes executing on the node 200. It will be apparent to those skilled in the art that other memory devices, including various computer readable media, may be used for storing and executing program instructions.

As shown, the arrayed forwarding engine 300 is coupled to the external memory (Ext Mem) resources 280, and the buffer and queueing unit (BQU) 210 is connected to a packet memory 220 for storing packets and to a queue memory 230 for storing headers of the packets on data structures, such as linked lists, that may be organized as queues 235. The BQU 210 further comprises data interface circuitry for interconnecting the forwarding engine 300 with a plurality of line cards 240 via a selector circuit 250 having an arbiter 255. The line cards 240 may comprise, e.g., OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the intermediate node 200 may include many input/output channels on these interfaces, each of which is associated with at least one queue 235 in the queue memory 230. The forwarding engine 300 generally functions as a switching processor that modifies packets and/or headers in sequence as the BQU 210 implements queuing operations.

A routing processor 260 executes conventional routing protocols for communication directly with the forwarding engine 300. The routing protocols generally comprise topological information exchanges between end nodes to determine optimal paths through the network based on, e.g., destination IP addresses. These protocols provide information used by the routing processor 260 to create and maintain routing tables (not shown). The tables may be loaded into the external memories 280 as forwarding information base (FIB) tables used by the forwarding engine 300 to perform forwarding operations. When processing a header in accordance with IP switching, engine 300 determines where to send the packet by indexing into the FIB tables using an IP address of the header. Execution of the forwarding operations results in destination media access control (MAC) addresses of the headers being rewritten by the forwarding engine 300 to identify output ports for the packets.

Figure 3:
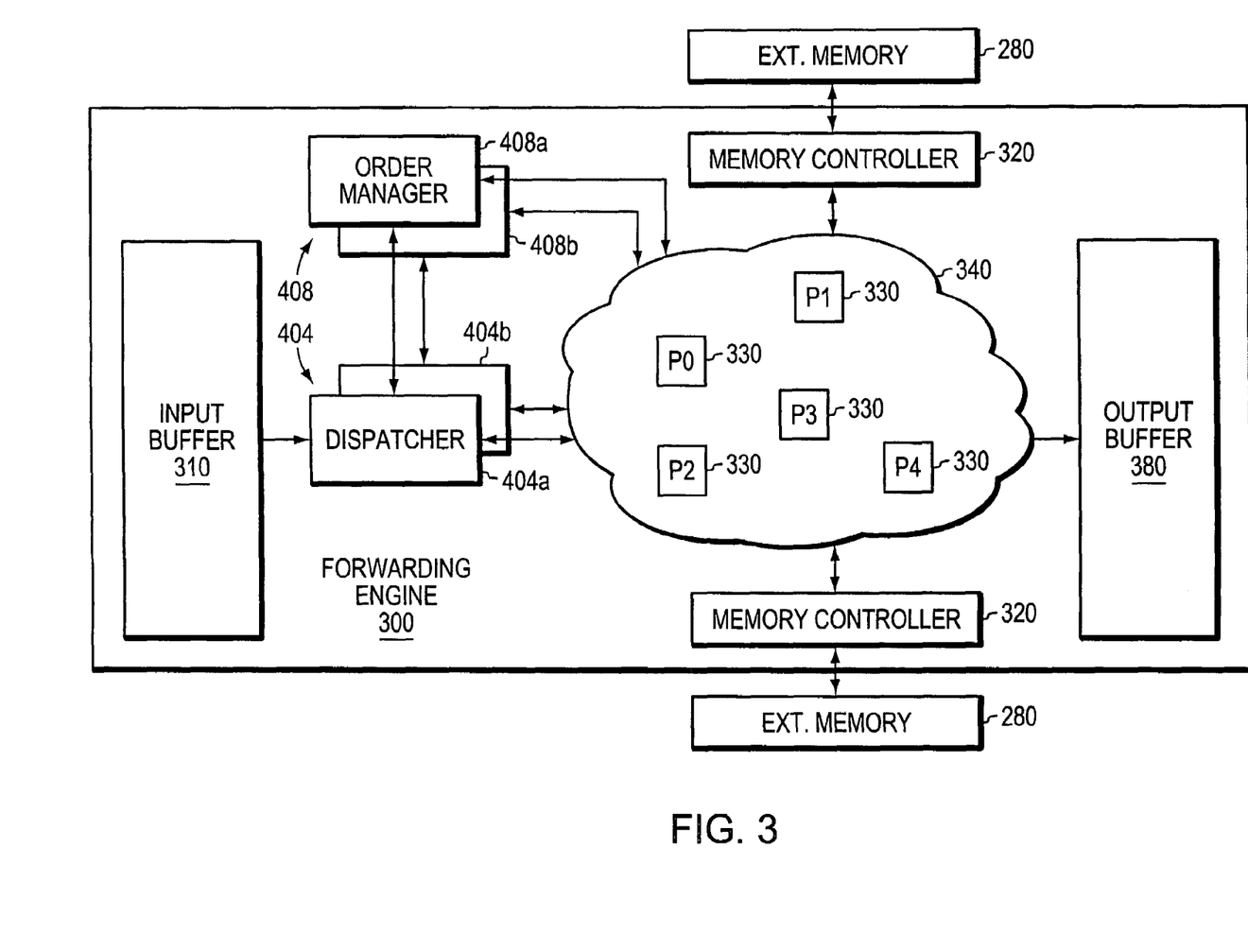
FIG. 3 is a partial schematic block diagram of the forwarding engine of the node of FIG. 2 having a pool of processors for use in analyzing packets.

FIG. 3 is a partial schematic block diagram of forwarding engine 300 comprising a pool 340 of processing elements, such as processors 330, each of which may be individually identified, e.g., P0, P1, P2, etc. The processors 330 are preferably interconnected by respective inter-processor links (not shown) so that they may communicate with each other. Each processor 330 preferably includes, inter alia, a plurality of arithmetic logic units (ALUs) and a register file having a plurality of general purpose registers that store intermediate result information processed by the ALUs. In accordance with the invention, the processors 330 may be organized into any advantageous arrangement, such as a one-dimensional (1-D) array, a mesh, a tree, a cube, a pool of unconnected processors, etc. It should be further noted that a single processor supporting multiple threads of execution can take advantage of the invention.

Forwarding engine 300 further includes an input buffer 310 that receives packets (or possibly just packet headers) that are to be processed, and an output buffer 380 for receiving packets or portions thereof once processing is complete. Coupled to the pool 340 of processors 330 are one or more memory controllers 320. Processors 330 utilize the memory controllers 320 in order to access external (EXT) memory 280. In accordance with the present invention, forwarding engine 300 also includes one or more dispatchers 404, such as dispatchers 404a and 404b, and one or more order managers 408, such as order managers 408a and 408b. In the illustrative embodiment, there is a corresponding order manager, e.g., order manager 408a, for each dispatcher 404, e.g., dispatcher 404a. As described herein, packets received at the input buffer 310 are passed to a selected dispatcher 404 which, in turn, allocates each packet to an available processors 330 from the pool 340 for processing. In the preferred embodiment, the allocated processor, e.g., P3, processes the respective packet to completion (including modifying the packet header) and forwards it to the output buffer 380. At that point, processor, P3, is available to process another packet. During packet processing, a processor 330 may access external memory 280 via the memory controllers 230. As each processor 330 in the preferred embodiment supports multiple threads, a single processor may process multiple packets at one time, each packet being allocated or assigned to a different thread.

The external memory 280 is preferably organized as one or more banks and implemented using reduced-latency-dynamic-random-access-memory (RLDRAM) devices. Nonetheless, those skilled in the art will recognize that other memory devices, such as synchronous random access memories (SRAMs), among others, could be used. The external memory 280 stores non-transient data (e.g., forwarding tables, queues, etc.) organized as a series of data structures for use in processing the transient data. All of the external memories 280 are preferably accessible from any of the processors 330 of the pool 340.

A suitable platform for intermediate node 200 is the 7200 series of routers from Cisco Systems, Inc. of San Jose, Calif.

Ordering Mechanism

Figure 4:
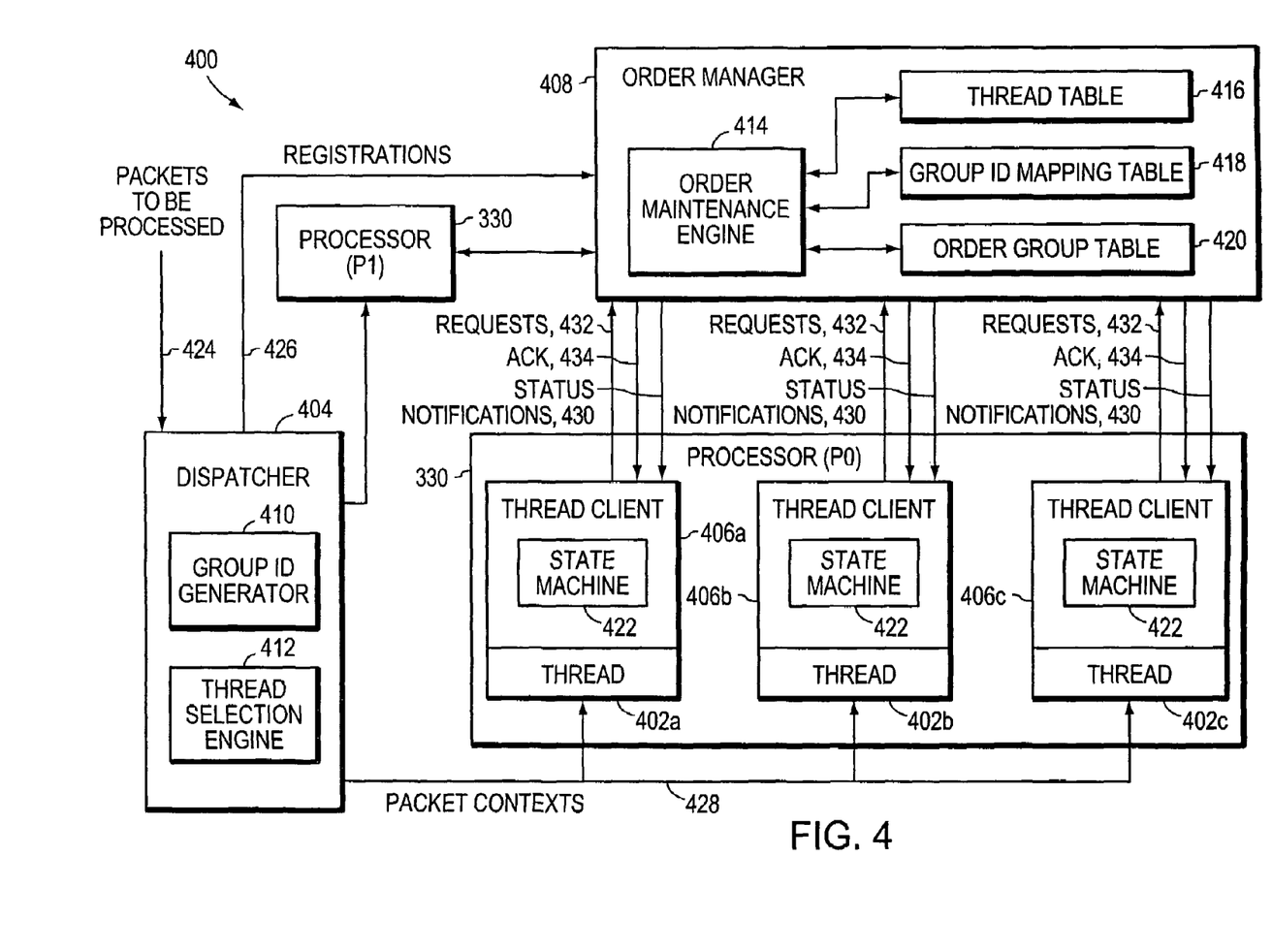
FIG. 4 is a highly schematic illustration of a preferred ordering system in accordance with the present invention.

FIG. 4 is a highly schematic illustration of a preferred ordering mechanism 400 in accordance with the present invention and a plurality of, e.g., two, processors 330, identified as P0 and P1. Processor P0 has one or more, e.g., three, threads 402a–c. Each thread 402 has its own set of resources (not shown) such as registers, instruction counter(s) and local storage. As explained herein, a thread may be in a free state in which case it is available for performing work or it can be allocated to some instruction sequence or process. Typically, an allocated thread will be working on a single packet (or portion thereof) at any given time. The ordering mechanism 400 includes a dispatcher 404, a thread client 406a–c for each thread 402a–c and an order manager 408. In addition, the dispatcher 404 includes a group identifier (ID) generator 410 and a thread selection engine 412. Each thread client 406, moreover, has a state machine engine 422 that can transition among a plurality of states as described herein. The order manager 408 includes an order maintenance engine 414 and one or more tables, such as a thread table 416, a group identifier (ID) mapping table 418 and an order group table 420.

Processor P1 also includes one or more threads (not shown).

In the illustrative embodiment, the thread table 416 and order group table 420 are stored in on-chip memory, such as on-chip SRAM or a register, while the group ID mapping table 418 is implemented through one or more content addressable memory (CAM) devices.

It will be understood by those skilled in the art that the dispatcher 404, the thread clients 406 and the order manager 408 may be formed from one or more logic circuits. Alternatively, these components may be implemented through one or more software modules or libraries residing, e.g., in the external memory 280, and containing program instructions pertaining to the methods described herein and executable by one or more processing elements, e.g., processors 330. Other computer readable media may also be used to store and execute these program instructions. Nonetheless, those skilled in the art will recognize that various combinations of hardware and software, including firmware, may be utilized to implement the present invention.

Figure 5:
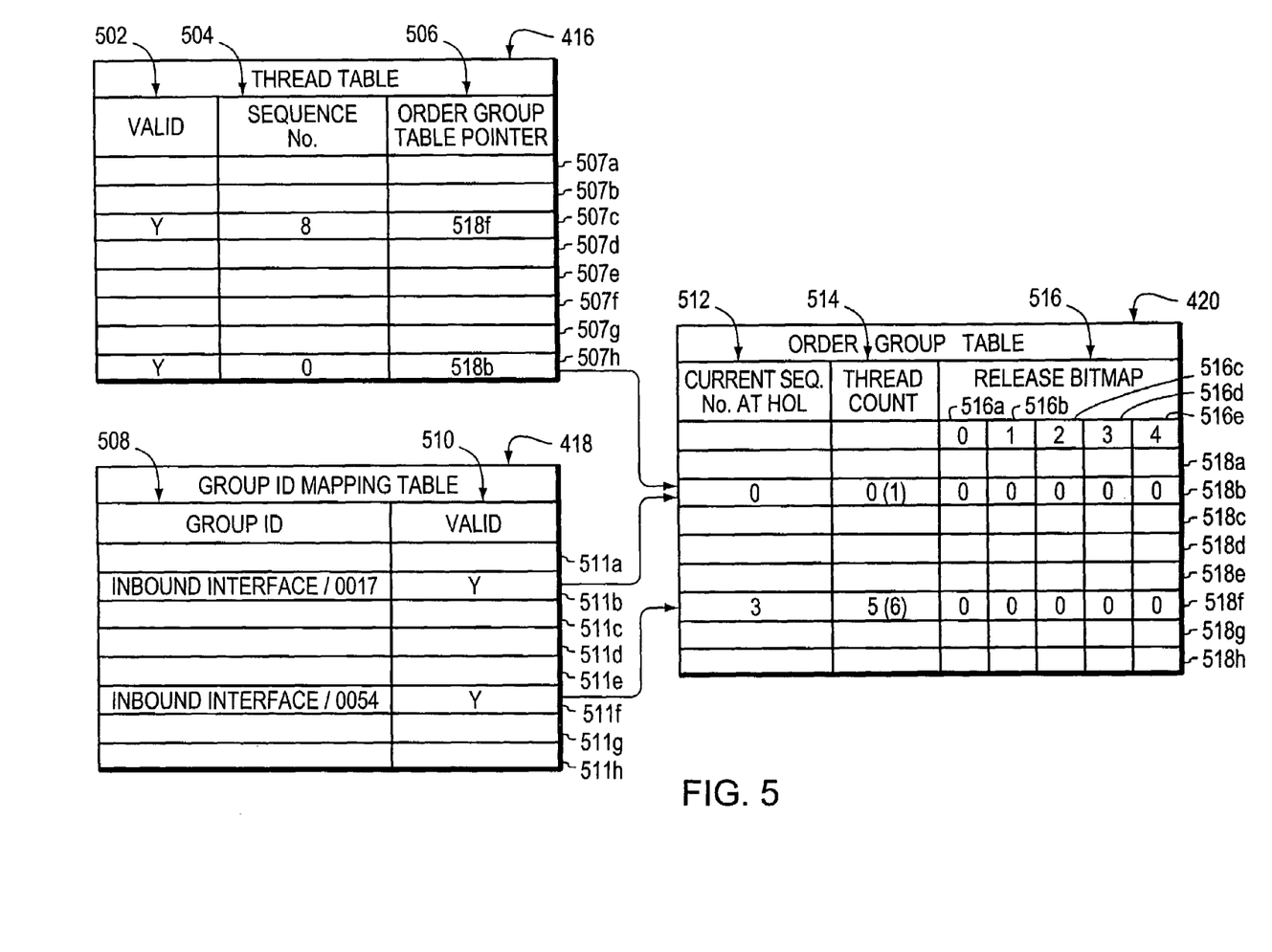
FIG. 5 is a schematic illustration of the interrelationship among the data structures of the ordering system of FIG. 4.

FIG. 5 is a highly schematic illustration of the interrelationship of the tables disposed at the order manager 408. Each table is preferably organized, at least logically, as a plurality of columns and rows whose intersections define cells or records for storing data or information. As shown, the thread table 416 preferably includes a valid column 502, a sequence number column 504, an order group table pointer column 506 and a plurality of rows 507a–h. The group ID mapping table 418 preferably includes a group ID column 508, a valid column 510 and rows 511a–h. The order group table 420 preferably has a Current Sequence (Seq.) Number (No.) at the Head of Line (HOL) column 512, a thread count column 514, a bitmap or vector 516, and a plurality of rows 518a–h. The bitmap 516 has a plurality, e.g., five, bit locations 516a–e also numbered "0" through "4".

As described herein, there is a one-to-one relationship between the entries 511 of table 418 and the entries 518 of table 420.

Basically, the dispatcher 404 assigns received packets to free threads and issues registrations to the order manager 408, which then uses the registrations to track the order of those threads operating on packets belonging to the same order group. The thread clients 406 and the order manager 408 cooperate to ensure that the threads 402 working in the same order group perform their processing of the packets in accordance with the threads' relative order within the corresponding order groups.

Upon initialization, the order manager 408 preferably marks each entry of the thread table 416 and group ID mapping table 418 as invalid.

Registering Threads to New and Existing Order Groups

As indicated by arrow 424, packets that require some type of processing are received by the dispatcher 404. It should be understood that such packets may come from any number of sources. For example, the packets may come from an external interface or an internal buffer, such as an ingress shaper, a re-circulating queue, or a re-ordering queue, etc. The dispatcher 404 may be configured to monitor these sources continuously. When a packet that requires processing is received, the thread selection engine 412 selects a free thread, e.g., thread 402b, to which the received packet is to be assigned. The thread selection engine 412 may maintain a free list of threads. Upon identifying a free thread, the dispatcher 404 preferably generates a packet context. In the preferred embodiment, the packet context includes the packet header, a packet handle (e.g., an identifier which may be generated by the dispatcher 404 or by some other entity), and information about the source of the packet, such as the external interface or internal queue from which the packet was received.

Next, the group ID generator 410 determines the initial or primary order group to which the packet belongs. As described herein, packets sharing a common criteria or attribute are preferably assigned to the same order group. Furthermore, as described herein, packets assigned to the same order group are processed in the order they were assigned to that group. That is, a packet assigned to a given order group is processed before all later assigned packets, but not until all previously assigned packets have been processed.

Each packet received from the same source, e.g., the same physical inbound interface, the same re-circulating queue, etc., is assigned to the same initial order group and are thus given the same group ID. A group ID defines the set of threads processing packets that share a common criteria or attribute, and over which order will be imposed. In the illustrative embodiment, the group IDs are free forms produced by concatenating the attribute or criteria type and the particular attribute or criteria value(s). Examples of initial group IDs are as follows:

"Inbound Interface"/interface number
"Re-circulating queue"/queue number
"Internal buffer"/buffer number The group ID generator 410 preferably generates the group ID in the format described above. Alternatively, the group ID generator 410 may maintain a list (not shown) that maps each potential source of packets, e.g., external interfaces, internal queues, etc., with a corresponding group ID value.

Suppose that a received packet maps to group ID value "Inbound Interface/0017".

The dispatcher 404 then registers the packet with the order manager 408, as indicated by arrow 426, by sending the assigned group ID value and an identifier (ID) of the selected thread, e.g., thread 402b, to the order manager 408.

The dispatcher 404 also sends the packet context to the selected thread 402b, as indicated by arrow 428. Engine 414 performs a look-up of its thread table 416 using the thread ID specified in the registration. In particular, each thread ID indexes to a corresponding row 507 of the thread table 416. Suppose thread 402b indexes to row 502h of the thread table 416. Upon identifying the respective row, i.e., row 502h, the order maintenance engine 414 updates the cell corresponding to the valid column 502 to reflect that thread 402b is now valid. Engine 414 then performs a look-up on the group ID mapping table 418 using the initial group ID value specified in the registration. If there is no matching entry for the specified group ID value, engine 414 preferably selects a free row or entry, e.g., row 511b, in table 418 and assigns it to this group ID by entering the group ID's value, i.e., "Inbound Interface/0017", in the cell corresponding to the group ID column 508. Engine 414 similarly selects the corresponding entry in the order group table 420, e.g., row 518b, and clears the cells corresponding to the sequence number column 512, the thread count column 514 and the near HOL column 516. That is, each of these cells is set to zero.

After creating the new entries in tables 418 and 420, engine 414 repeats its search of the group ID mapping table 418. This time the search returns a match to the newly created entry, i.e., row 511b, and entry 511b, in turn, infers the corresponding entry in the order group table 420, i.e., row 518b. The order maintenance engine 414 then assigns a sequence number to the thread. In the illustrative embodiment, each thread of a given order group is assigned a strictly increasing sequence number based on the thread's arrival or assignment to the given order group. The thread's sequence number thus specifies its order relative to the other threads of the given order group. To assign the sequence number, engine 414 returns to entry 507h of the thread table 416 and sets the cell corresponding to the sequence number column 504 to the current sequence number at HOL plus thread count values from the respective cells of row 518b of the order group table 516 that correspond to columns 512 and 514. In this case, the two values are zero, therefore the sequence cell of row 507h corresponding to column 504 is set to zero. Engine 414 then sets the pointer cell corresponding to column 506 with a pointer to row 518b of the order group table 420, as illustrated by the "518b" value shown therein. Next, engine 414 increments by one the cell of row 518b that corresponds to the thread count column 514, as indicated in parentheses, so that the thread count cell reflects the current number of active threads associated with this order group.

Each time the order manager 408 receives a new registration for an existing order group ID value, it uses the specified order group ID value, e.g., "Inbound Interface/0054", to index into the group ID mapping table 418, and utilizes the matching entry, e.g., row 511f, to confirm that the order group ID value is valid (as indicated by the contents of the valid cell corresponding to column 510) and to identify the corresponding entry, e.g., row 518f, in the order group table 420 for this group ID value. Engine 414 then adds together the values from the cells corresponding to the current sequence number at HOL column 512 and the thread count column 514, i.e., "3" and "5", to generate a sum, i.e., "8". Engine 414 then accesses the respective entry, e.g., row 507c, of the thread table 416, sets the valid cell corresponding to column 502 to indicate that the thread is now valid, and enters the computed sum, i.e., "8", into the sequence cell corresponding column 504. Engine 414 also loads the pointer cell corresponding to column 506 with a pointer to the entry or row in the order group table 420 for the respective group ID value, as illustrated by the "518ƒ" value shown therein. Engine 414 then increments by one the thread count cell at table 420 corresponding to column 514, as indicated in parentheses.

Notifying Threads of Their Order Status

The order manager 408, by maintaining the information in the tables 416–420, keeps track of each active thread's order within the thread's order group. More specifically, as each thread 402 is registered with the order manager 408, the thread 402 is assigned a unique sequence number, which is stored in the sequence cell corresponding to column 504 of the thread table 416. As mentioned above, a thread's sequence number, which does not change, specifies the thread's relative order in its order group. In the preferred embodiment, the first thread that is registered for a given order group is assigned sequence number "0, the second thread is assigned sequence number "1", the third thread is assigned sequence number "2", and so on. In addition, at the entry of table 420 for the given order group ID value, the current sequence number at HOL cell, which corresponds to column 512, indicates which particular sequence number (hence which thread) happens to be at the HOL for the respective order group, while the cell corresponding to the thread count column 514 identifies the total number of threads that are currently active for the respective order group.

To ensure that the threads associated with the same order group all perform their processing in the appropriate order, the thread clients 406 block or suspend the threads 402 from performing any "ordered" tasks unless and until the thread 402 is at the head-of-line (HOL) of the respective order group. A given thread 402, moreover, is considered to be at the HOL for its order group when the thread's assigned sequence number, as reflected in the thread table 416, matches the current sequence number at HOL value in the order group table 420. As each thread 402 reaches the HOL of its order group and completes its processing, the thread 402 is removed from the order group and the current sequence number at HOL value is incremented, thereby allowing the next thread in line to reach the HOL.

Figure 6:
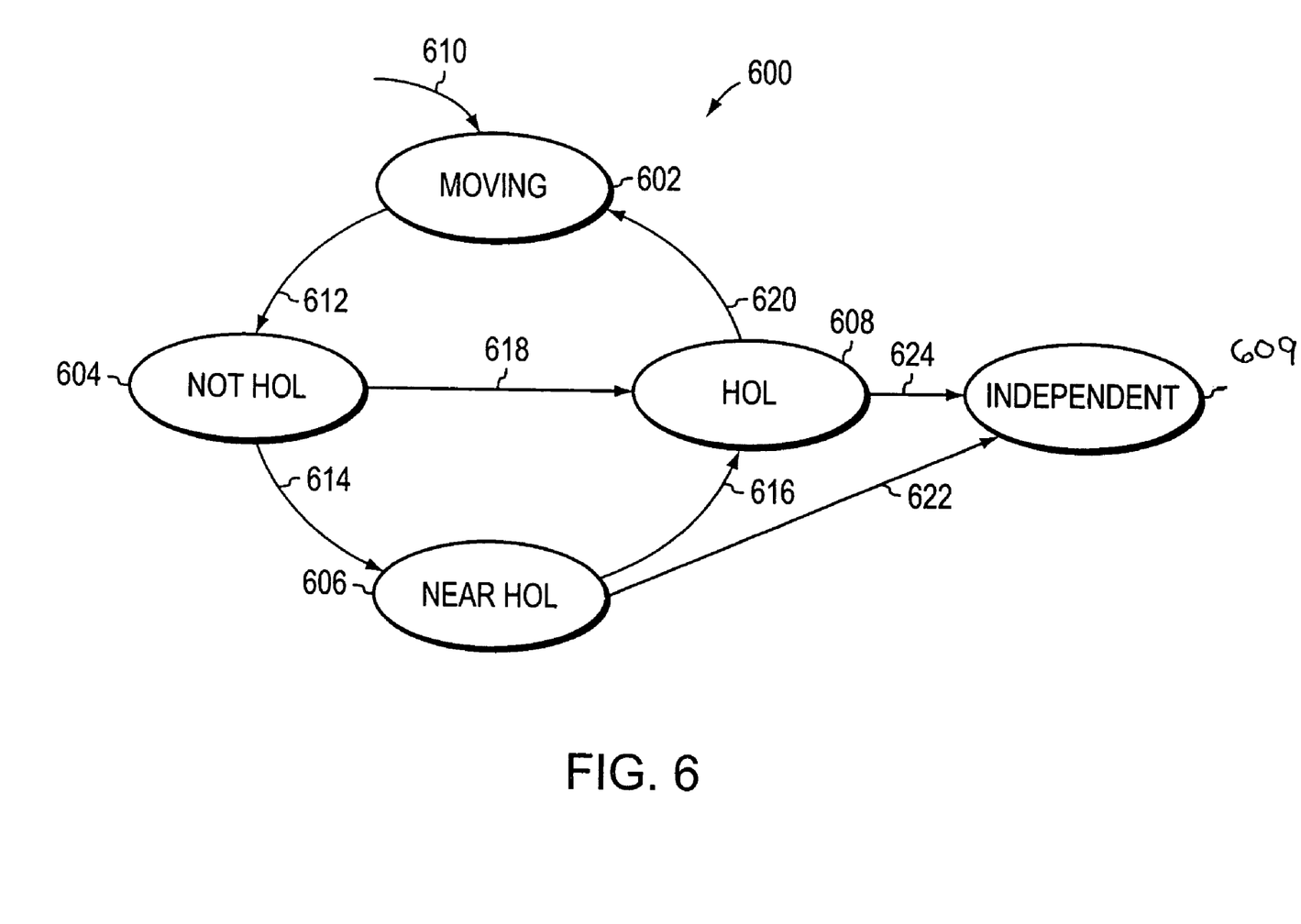
FIG. 6 is a schematic illustration of a state diagram implemented by the ordering system of FIG. 4.

In the preferred embodiment, each thread client 406 maintains state for its thread 402 that indicates the thread's relative position in the respective order group. FIG. 6 is a highly schematic state diagram 600 in accordance with the present invention. In the preferred embodiment, a thread 402 may be in any one of five possible states: a Moving state 602, a Not Head-of-Line (HOL) state 604, a Near HOL state 606, a HOL state 608 and an Independent state 609. The Moving state 602 is used when a thread is moving into a first order group or is moving from one order group to another. The Moving state 602 is provided to handle the case that the Order Manager 408 can not respond to certain requests instantaneously. The thread client 406 transitions out of the Moving state 602 upon indication from the order manager 408 that the request has been accepted. The Not HOL state 604 is used when a thread is in an order group and the thread is not currently at the HOL of that order group. The Near HOL state 606 is used when a thread is in an order group and is within some predefined range of the HOL of that order group. The HOL state 608 is used when a thread is in an order group, and is the thread at the HOL for that order group. The Independent state 609 is used when a thread is no longer associated with an order group. In addition, certain transitions among the states are permitted. Arrows 610–624 indicated the permissible transitions among the states 602–609. A respective machine 422 disposed at each thread client 406 transitions the respective thread 402 among the states 602–609 in response to requests issued by the thread 402 to the order manager 408, as well as in response to order status notifications received from the order manager 408.

As indicated above, the order manager 408 also provides the threads 402 via the thread clients 406 with information regarding the threads' relative order within their order groups. Preferably, the order maintenance engine 414 continuously generates status information for each valid thread 402 listed in the thread table 416. Specifically, for each entry 507 of table 416 that is valid, engine 414 first determines whether the respective thread is at the head-of-line (HOL) of its order group. A thread is at the HOL of its order group if the thread's sequence number (as stored in the thread table 416) matches the current sequence number at HOL value from the order group table 420 for that order group. If the thread is at the HOL, engine 414 generates and issues a "HOL" status notification to the thread, as indicated by arrows 430. If the thread is not at the HOL, engine 414 determines whether it is nonetheless near the HOL. A thread is near the HOL if its sequence number is within a defined range of the current sequence number that is at the HOL as specified in the order group table 420 for that order group. The defined range corresponds to the length of the Release bitmap 516, in this case five bits. The release bitmap 516 keeps track of threads that have requested to be released from their order group, but have not yet reached the HOL. If the thread is within the defined range, engine 414 generates and issues a "near HOL" status notification to the thread, as also indicated by arrow 430. If the thread is not near HOL, engine 414 generates and issues a "not HOL" status notification to the thread.

Ideally, the release bitmap 516 is made as long as the total number of threads minus one. This would allow any thread 402 to request to be released from its order group at any time, and would thus eliminate the need for a "not HOL" status notification as well as the not HOL state 604 in the thread client 406. However, practical limitations, such as the available space on the logic circuit, will typically dictate a smaller size.

In response to the status notifications from the order maintenance engine 414, the state machines 422 at the thread clients 406 transition the threads 402 among the above-mentioned states. For example, when a thread 402 receives a packet context to be processed from the dispatcher 404, the thread's state machine 422 preferably enters the moving state 602, as indicated by arrow 610. Assuming there are already more than five other threads currently assigned to the same order group, the thread client 406 will receive a not HOL status notification from the order manager 408. As indicated by arrow 612, the state machine 422 responds by transitioning from the moving state 602 to the Not HOL state 604. If the number of active threads for this group ID ahead of this thread falls to or below five, the thread client 406 will receive a Near HOL status notification from the order manager 408. In response, the state machine 422 will transition from the Not HOL state 604 to the Near HOL state, as indicated by arrow 614. Next, the thread client may receive a HOL status notification, indicating that the thread has reached the HOL for its order group and causing the state machine 422 to transition to the HOL state 608, as indicated by arrow 616. It should be understood that a thread 402 may transition from the Not HOL state 604 directly to the HOL state 608 as indicated by arrow 618. After completing its processing of the packet, the thread transitions from the HOL or the Near HOL states 608, 606 to the Independent state 609, as indicated by arrows 624 and 622.

It should be understood that other states may be utilized either in addition to or in place of any of the above-described states. In fact, the present invention may utilize no states at all or just two states, e.g., the Not HOL state and the HOL state.

When a thread 402 needs to perform an ordered task, such as access a shared or global resource, e.g., memory, the thread 402 is preferably configured, e.g., through microcode executing on that thread 402, to issue a "Wait_HOL" primitive to its thread client 406. In response to the Wait_HOL primitive, the thread client 406 suspends further activity by the thread 402 until the thread client 406 receives a status notification from the order manager 408 indicating that the thread 402 has reached the HOL of its order group. Upon receipt of the HOL status notification, the thread client 406 un-suspends the thread 402, thereby allowing it to perform the ordered task.

A thread 402 may perform an "unordered" task at any time regardless of its current order in the order group. To perform an unordered task, such as determine the packet's protocol type, generate a forwarding decision, access shared external memory 280, re-write the packet's header, etc., the thread 402 simply performs the respective task, rather than issuing a Wait_HOL primitive to the thread client 406. That is, in accordance with the present invention, a thread 402 can perform both ordered and unordered tasks. In the illustrative embodiment, the microcode running or executing on the threads 402 themselves determine which tasks are ordered tasks, requiring the threads to be at the HOL of the order group, and which tasks are unordered tasks that can be performed at any time.

Issuing Order Group Exchange Requests

A thread 402 may also change the order group to which its belongs while it is processing a given packet. For example, suppose a series of packets are received on the same external interface, e.g., Interface 45. As described above, the dispatcher 404 will initially assign each of these packets to the same order group, e.g., order group "Inbound Interface/0044", and assign them to different threads 402 for processing. Suppose further that the series of packets received on Interface 45 belong to different protocol types, such as the Internet Protocol (IP), the Internet Protocol eXchange (IPX), the Simple Network Management Protocol (SNMP), etc., and that only packets corresponding to the same protocol type need to be kept in order relative to each other. That is, all of the IP packets received on Interface 45 need to be maintained in order, but the IP packets can be processed out-of-order relative to the IPX and SNMP packets received on Interface 45.

If, during the processing of its packet, a thread 402 determines that its packet is an IP packet, it preferably issues a request to change its order group from the order group for packets received on physical Interface 45, i.e., order group "Inbound Interface/0044", to the order group for IP packets received on physical Interface 45, e.g., order group "Inbound Interface/0044/Protocol Type/IP". It should be understood that a thread 402 may generate the new group ID value by concatenating the existing group ID value with the new attribute or criteria and its corresponding value(s). Alternatively, the thread may access a predefined data structure stored in Ext Mem 280. In response, the microcode running on the thread 402 preferably generates and issues an "Exchange" primitive to its thread client 406. The thread client 406, in turn, issues an Exchange request to the order manager 408, as indicated by arrows 432. The Exchange request specifies the new order group, i.e., order group "Inbound Interface/0044/Protocol Type/IP". In the illustrative embodiment, a thread 402 must be at the HOL of its current order group, i.e., "Inbound Interface/0044", in order to issue an Exchange primitive. If the thread 402 is not at the HOL, when it issues the Exchange primitive, the thread client 406 will stall the thread 402 until the thread reaches the HOL.

Upon receiving the Exchange request, the order maintenance engine 414 looks up the requesting thread in the thread table 416 to determine the current order group to which the thread belongs, and to retrieve the pointer into the corresponding entry of the order group table 420. Engine 414 then increments by one the value stored in the current sequence number at HOL cell corresponding to column 512, to indicate that the next thread in this order group is now at the HOL, and decrements by one the value stored in the thread count cell corresponding to column 514, to indicate that there is one less active thread for this order group, i.e., the thread that issued the Exchange request. Next, engine 414 examines the Release bitmap for this order group entry. If the leftmost bit of the release bitmap, i.e., entry 516*a*, is asserted, e.g. set to "1", this indicates that the next thread in order has previously requested to be released from its order group. In this case, engine 414 shifts the release bitmap left by one (also referred to as a zero fill operation), increments the current sequence number at HOL cell corresponding to column 512 and decrements by one the thread count cell corresponding to column 514. The engine 414 repeats these steps until the leftmost bit 516*a* of the release bitmap 516 is zero.

After removing the subject thread from its current order group, engine 414 adds the thread to the new order group, i.e., order group "Inbound Interface/0044/Protocol Type/ IP". Specifically, engine 414 performs a look-up on the group ID mapping table 418 using the group ID value specified in the Exchange request. If there is no matching entry, a new entry is created as described above in connection with the registration process. If an entry is found for the new order group, engine 414 returns to the entry of the thread table 416 that corresponds to the subject thread 402 and sets the sequence number cell corresponding to column 504 to the value of the current sequence number at HOL plus the value of the thread count cell from the entry in the order group table 516 for order group "Inbound Interface/0044/ Protocol Type/IP". Engine 414 then sets the pointer cell corresponding to column 506 for the subject thread with a pointer to the entry or row of the order group table 420 for the new order group. Next, engine 414 increments by one the thread count cell corresponding to column 514.

The subject thread is now a member of the new order group. It may perform unordered tasks at any time, but must wait until it reaches the HOL of the new order group before performing any ordered tasks.

To prevent race conditions, attempts by a thread 402 to further change or to query its order group through the issuance of subsequent requests will be stalled by the thread client 406 until the current request is acknowledged, via an acknowledgement (ACK) bus 434.

It should be understood that there is no limit to the number of times a thread may change order groups. Typically, each time a thread 402 issues an Exchange request, the granularity or detail of the shared criteria or attribute increases. That is, new order groups are entered as new or additional criteria or attributes of the packet are uncovered by the thread 402. An exemplary sequence of group IDs is as follows.

(1) Inbound Interface/0044

(2) Inbound Interface/0044/Protocol Type/IP (3) Inbound Interface/0044/Protocol Type/IP/Application Flow/source address, destination address, source port, destination port, protocol type (4) Outbound Interface/0071

Furthermore, a thread's position in a new order group is based on the time the Exchange request is made to the order manager 408, which, as described above, requires the thread to be at the HOL of its current order group.

It should be understood that order groups may established based upon any selected criteria or attribute that may be shared by two or more packets. For example, a packet's initial or primary order group may depend on the physical interface, such as the time division multiplex (TDM) channel, multi-link channel, circuit, etc., on which the packet is received. Subsequent order groups may be based upon the logical interface on which a packet is received, such as the virtual local area network (VLAN), virtual channel (VC), or data link connect identifier (DLCI). Other criteria or attributes for subsequent order groups include the inbound tunnel interface, the layer three (L3) protocol type, outbound logical interface, outbound tunnel, etc.

It should be further understood that the criteria or attribute(s) that distinguish two or more order groups may be a step or operation as opposed to some additional detail derived from the packet itself. For example, threads processing IP packets received on the same interface may all need to access multiple, e.g., three, different shared resources in order and/or they may need to access the same shared resource multiple times in order. In this case, the following order groups may be established.

(1) Inbound Interface/044/Protocol Type/IP/Step/001
(2) Inbound Interface/044/Protocol Type/IP/Step/002
(3) Inbound Interface/044/Protocol Type/IP/Step/003

As shown, the only attribute or criterion that distinguishes these three order groups is the particular step being performed, e.g., the particular shared resource to be accessed. When a thread that is part of the first order group reaches the HOL, it accesses the shared resource corresponding to step 001. The thread then changes to the second order group and when it reaches the HOL for this order group, it accesses the shared resource corresponding to step 002, and so on.

Those skilled in the art will recognize that other such criteria or attributes may be employed in the definition of order groups.

Issuing Order Group Release Requests

When a thread 402 completes its ordered processing of the packet, the thread 402 preferably generates and issues a "Release" primitive to its thread client 406. The thread client will then issue a Release request to the order manager 408. In the illustrative embodiment, a thread 402 can only issue a "Release" primitive if it is in the HOL state 608 or the Near HOL state 606. If the thread is not in one of these states, its thread client 406 will suspend the thread 402 in response to the "Release" primitive until it reaches either of these states. Once the Release request is issued to the order manager 408, the thread client 406 moves the thread 402 to the Independent state 609.

In response to the Release request, the order maintenance engine 414 looks up the subject thread in the thread table 416, and uses the pointer in the cell of column 506 to identify the corresponding entry in the order group table 420. At this time, the order maintenance engine 414 also marks the entry in the thread table 416 for this thread as not valid. If the thread's sequence number matches the current sequence number at the order group table 420, indicating that the thread is at the HOL for this order group, engine 414 removes the thread from the order group. Specifically, engine 414 increments by one the value stored in the current sequence number at HOL cell corresponding to column 512, to indicate that the next thread in this order group is now at the HOL, and decrements by one the value stored in the thread count cell corresponding to column 514 to indicate that the thread that issued the Release request is no longer a member of this order group. Next, engine 414 examines the Release bitmap for this order group entry. If the leftmost bit of the release bitmap, i.e., entry 516a, is asserted, e.g. set to "1", engine 414 performs a zero fill operation as described above.

If the thread's sequence number does not match the current sequence number at HOL for this order group, then engine 414 adds the thread to the release bitmap. In particular, engine 414 computes the thread's position in the release bitmap by subtracting the current sequence number at HOL value from the cell corresponding to column 512 from the thread's sequence number. Then, considering the leftmost release bit 516a as a difference of "one", engine 414 selects the bit location in the release bitmap 516 for the thread that issued the Release request. Suppose that the computed difference is five. In this case, engine 414 selects the fifth bit location, i.e., cell 516e. Engine 414 then asserts the selected bit location 516e of the release bitmap 516.

After issuing the Release primitive, a thread may perform any post-packet processing tasks that do not require ordering, such as statistical computations, resource cleanup, etc. Once any such post-packet processing tasks are completed, the thread 402 preferably issues a "Free_Thread" primitive to its thread client 406. The thread client 406 responds by suspending the thread and notifying the dispatcher 404 that the thread is available. At this point, the dispatcher 404 may assign a new packet to the thread 402 for processing.

A thread 402 may choose to issue the Free Thread primitive without first issuing the Release primitive, i.e., the thread is not in the Independent state 609. In this case, the thread client 406 will automatically issue a Release request to the order manager 408. If the thread was not in the HOL or Near HOL states, then the thread client 406 will suspend the thread and delay sending the Release request to the order manager 408 until it moves to the HOL or Near HOL state.

As shown, with the present invention, later received packets belonging to one order group are not stalled pending the completion of earlier received packets from some other order group. Thus, packets that are independent of each other are allowed to pass each other during processing.

In a further aspect of the present invention, a thread 402 that is waiting to reach the HOL for its current order group can push its current packet into a queue and move on to performing other tasks or work. Specifically, a separate queue is preferably established for each potential order group. The queues may be appended to the rows of the order group table 420. A thread waiting to reach the HOL, can store its packet context together within any computed values and/or state information in the queue. The thread's sequence number is also loaded into the queue. The thread is then free to perform other processing tasks. When the sequence number of the packet context stored in the queue matches the current sequence number at HOL, the packet context is de-queued and processed.

It should be understood that the present invention may operate with other network messages besides packets, such as frames, cells, fragments, etc., and that the term network message is intended to encompass all such messages.

The thread table 416 preferably has a separate entry for each thread 402 disposed in the forwarding engine 300. To accommodate the situation in which each thread is active and is assigned to a different order group, the lengths of both the group ID mapping table 418 and the order group table 420 also equal the total number of threads.

Those skilled in the art will recognize that the information of tables 416–420 may be implemented in other ways, e.g., in linked lists, etc. The ordered group table 420, moreover, need not include a release bitmap.

Those skilled in the art will recognize that other arrangements and configurations may be employed to obtain the benefits and advantages of the present invention. For example, the functions performed by the thread clients may be incorporated into the order manager. Furthermore, multiple instances of dispatchers and order managers may be provided, each such instance assigned to a different set of the threads at the forwarding engine. Still further, the present invention may be employed in other multi-threaded computing environments in addition to the forwarding engine of an intermediate network nodes as described herein.

It will also be understood that one or more of the dispatchers and/or order managers may be incorporated within the input buffer 310 or within some other component of forwarding engine 300.

The foregoing description has been directed to specific embodiments of this invention. It will be apparent that other variations and modifications may be made to the described embodiments, with the attainment of some or all of their advantages. For example, the present invention may be used in other computer environments besides systolic array architectures. Indeed, the present invention may be used in any multi-threaded computer system, including single processor systems and multiprocessors systems having other topologies besides arrays. Therefore, it is an object of the appended claims to cover all such variations and modifications as come within the true spirit and scope of the invention.

What is claimed is:

1. In an intermediate network node having a plurality of interfaces for sending and receiving network messages within a computer network, a forwarding engine configured to process network messages received at the intermediate network node, the forwarding engine comprising:
   a plurality of threads for processing the received network messages;
   a dispatcher for assigning at least a portion of the network messages to selected ones of the plurality of threads, wherein the dispatcher associates each network message with an order group;
   an order manager in communicating relationship with the plurality of threads for tracking the relative order among threads associated with the same order group; and
   a thread client associated with each thread, the thread clients configured to ensure that the threads process their respective network messages according to the threads' relative order within the order group.

2. The forwarding engine of claim 1 wherein the dispatcher associates all network messages that share a dependency with the same order group.

3. The forwarding engine of claim 2 wherein
   the intermediate network node has a plurality of physical interfaces and a plurality of logical interfaces, and
   the dependency is one of the physical interface and logical interface on which the network messages are received.

4. The forwarding engine of claim 1 wherein the network messages are one of packets, frames, and cells.

5. The forwarding engine of claim 1 wherein the threads are configured to issue requests to the order manager to change the order group with which the threads are associated as the threads process their respective network messages.

6. The forwarding engine of claim 5 wherein
   the order manager tracks which thread is at a head of the relative order;
   a given thread is blocked from changing its order group until the given thread reaches the head of its current order group.

7. The forwarding engine of claim 1 wherein
   the order manager tracks which thread is at a head of the relative order;
   the thread clients suspend the threads from performing at least some processing of the network messages until a thread is at the head of the relative order.

8. The forwarding engine of claim 6 wherein the threads perform at least some processing of the network messages before the threads reach the head of the relative order.

9. The forwarding engine of claim 7 wherein the order manager comprises:
   an order group table that is manipulated to indicate which thread is at the head of line for each order group; and
   a thread table that specifies where in the relative order each thread is located for its order group.

10. The forwarding engine of claim 9 wherein the order manager manipulates the order group table, as each thread reaches the head of line of its order group and completes its processing of the respective packet, so as to indicate that a next thread in the relative order has reached the head of line of the order group.

11. The forwarding engine of claim 9 wherein
    each order group is assigned a group identifier (ID) value; and
    the order manager further comprises a group ID table that maps group ID values to corresponding entries in the order group table for the respective order groups.

12. The forwarding engine of claim 1, further comprising:
    a thread executing actions which are not order sensitive before the thread reaches a head of the relative order.

13. A method for processing network messages received at an intermediate network node that has a plurality of interfaces for sending and receiving network messages within a computer network, the method comprising:
    providing a plurality of threads for processing the received network messages;
    assigning at least a portion of network messages received at an intermediate network node to threads selected from the plurality of threads;
    associating each network message assigned to a thread with an order group;
    tracking the relative order among threads associated with the same order group; and
    ensuring that the threads process their respective network messages according to the threads' relative order within the order group.

14. The method of claim 13, further comprising:
    associating all network messages that share a dependency with the same order group.

15. The method of claim 14, further comprising:
    allowing the dependency to be the physical and logical interface on which the network messages are received when the network node has a plurality of physical interfaces and a plurality of logical interfaces.

16. The method of claim 13, further comprising:
    assigning the network messages that are packets, frames, and cells.

17. The method of claim 13, further comprising:
changing the order group with which the threads are associated as the threads process their respective network messages.

18. The method of claim 17, further comprising:
tracking which thread is at a head of the relative order; and
blocking that thread from changing its order group until the given thread reaches the head of its current order group.

19. The method of claim 13, further comprising:
tracking which thread is at a head of the relative order; and
suspending the threads from performing at least some processing of the network messages until a thread is at the head of the relative order.

20. The method of claim 18, further comprising:
performing at least some processing of network messages by the threads before the threads reach the head of the relative order.

21. The method of claim 19, further comprising:
providing an order group table that is manipulated to indicate which thread is at the head of the line for each order group; and
providing a thread table that specifies where in the relative order each thread is located for its order group.

22. The method of claim 21, further comprising:
manipulating the order group table, as each thread reaches the head of line of its order group and completes its processing of the respective packet, so as to indicate that a next thread in the relative order has reached the head of line of the order group.

23. The method of claim 21, further comprising:
assigning a group identifier to each order group; and
providing a group identifier table that maps group identifier values to corresponding entries in the order group table for the respective order groups.

24. The forwarding engine of claim 13, further comprising:
executing actions by a thread which are not order sensitive before the thread reaches a head of the relative order.

25. In an intermediate network node having a plurality of interfaces for sending and receiving network messages within a computer network, a forwarding engine configured to process network messages received at the intermediate network node, the forwarding engine comprising:
means for providing a plurality of threads for processing the received network messages;
means for assigning at least a portion of network messages received at an intermediate network node to threads selected from the plurality of threads;
means for associating each network message assigned to a thread with an order group;
means for tracking the relative order among threads associated with the same order group; and
means for ensuring that the threads process their respective network messages according to the threads' relative order within the order group.

26. The forwarding engine of claim 25, further comprising:
means for associating all network messages that share a dependency with the same order group.

27. The forwarding engine of claim 26, further comprising:
means for allowing the dependency to be the physical and logical interface on which the network messages are received when the network node has a plurality of physical interfaces and a plurality of logical interfaces.

28. The forwarding engine of claim 25, further comprising:
means for assigning the network messages that are packets, frames, and cells.

29. The forwarding engine of claim 25, further comprising:
means for changing the order group with which the threads are associated as the threads process their respective network messages.

30. The forwarding engine of claim 29, further comprising:
means for tracking which thread is at a head of the relative order; and
means for blocking that thread from changing its order group until the given thread reaches the head of its current order group.

31. The forwarding engine of claim 25, further comprising:
means for tracking which thread is at a head of the relative order; and
means for suspending the threads from performing at least some processing of the network messages until a thread is at the head of the relative order.

32. The forwarding engine of claim 30, further comprising:
means for performing at least some processing of network messages by the threads before the threads reach the head of the relative order.

33. The forwarding engine of claim 31, further comprising:
means for providing an order group table that is manipulated to indicate which thread is at the head of the line for each order group; and
means for providing a thread table that specifies where in the relative order each thread is located for its order group.

34. The forwarding engine of claim 33, further comprising:
means for manipulating the order group table, as each thread reaches the head of line of its order group and completes its processing of the respective packet, so as to indicate that a next thread in the relative order has reached the head of line of the order group.

35. The forwarding engine of claim 33, further comprising:
means for assigning a group identifier to each order group; and
means for providing a group identifier table that maps group identifier values to corresponding entries in the order group table for the respective order groups.

36. The forwarding engine of claim 25, further comprising:
executing actions by a thread which are not order sensitive before the thread reaches a head of the relative order.

* * * * *